(12) United States Patent
Bock et al.

(10) Patent No.: US 8,724,705 B2
(45) Date of Patent: May 13, 2014

(54) DETECTING REPETITION IN DIGITAL VIDEO

(75) Inventors: Alois Martin Bock, Hampshire (GB); Satyaghosh Ammu, Hampshire (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 525 days.

(21) Appl. No.: 12/996,920

(22) PCT Filed: Jun. 26, 2008

(86) PCT No.: PCT/EP2008/058146
§ 371 (c)(1),
(2), (4) Date: Dec. 8, 2010

(87) PCT Pub. No.: WO2009/155979
PCT Pub. Date: Dec. 30, 2009

(65) Prior Publication Data
US 2011/0080525 A1    Apr. 7, 2011

(51) Int. Cl.
*H04N 7/26* (2006.01)
*H04N 5/14* (2006.01)

(52) U.S. Cl.
USPC .................. 375/240.16; 348/700; 348/701

(58) Field of Classification Search
CPC ....... H04N 5/14; H04N 7/26; H04N 19/0278; H04N 1/00
USPC ........... 348/701, 669, 700; 382/239; 375/240, 375/240.16, 240.15, 240.24
See application file for complete search history.

(56) References Cited

U.S. PATENT DOCUMENTS 5,731,850 A * 3/1998 Maturi et al. .................. 348/699
5,801,778 A * 9/1998 Ju ............................ 375/240.15
(Continued)

FOREIGN PATENT DOCUMENTS

EP    1 024 456       8/2000
EP    1 024 456 A2    8/2000
(Continued)

OTHER PUBLICATIONS

International Search Report for PCT/EP2008/058146, mailed Jan. 5, 2009.

*Primary Examiner* — Christopher S Kelley
*Assistant Examiner* — Deirdre Beasley
(74) *Attorney, Agent, or Firm* — Nixon & Vanderhye, P.C.

(57) ABSTRACT

There is provided a method of detecting repeated pictures in a sequence of video picture data, each picture of said video picture data comprising a plurality of macroblocks, the method comprising performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level, providing a noise threshold value based upon the zero motion vector sum of absolute difference values from the top level of the hierarchical motion estimation, accumulating the best motion vector sum of absolute difference values for macroblocks having best motion vector sum of absolute difference values greater than the noise threshold value to provide a distortion value for the picture, and setting a repeat flag dependent upon the distortion value. An apparatus adapted to carry out the method, and a computer readable medium carrying instructions which, when executed by a computer, cause the computer to carry out the method are also provided.

17 Claims, 7 Drawing Sheets

(56) References Cited

U.S. PATENT DOCUMENTS

| | | |
|---|---|---|
| 5,852,473 A | 12/1998 | Horne et al. |
| 6,058,140 A | 5/2000 | Smolenski |
| 6,198,772 B1 * | 3/2001 | Boice et al. ............. 375/240.17 |
| 6,625,216 B1 | 9/2003 | Zhu |
| 7,180,570 B1 | 2/2007 | He et al. |
| 7,203,238 B2 | 4/2007 | Liu et al. |
| 7,551,232 B2 * | 6/2009 | Winger et al. ................ 348/607 |
| 7,663,701 B2 * | 2/2010 | de Garrido et al. ........... 348/620 |
| 2002/0064228 A1 * | 5/2002 | Sethuraman et al. .... 375/240.12 |
| 2002/0150162 A1 | 10/2002 | Liu et al. |
| 2003/0063671 A1 | 4/2003 | Song |
| 2004/0013201 A1 | 1/2004 | Song et al. |
| 2004/0114817 A1 * | 6/2004 | Jayant et al. ................. 382/239 |
| 2005/0018086 A1 * | 1/2005 | Lee et al. ...................... 348/700 |
| 2007/0019114 A1 * | 1/2007 | de Garrido et al. ........... 348/701 |
| 2007/0081588 A1 | 4/2007 | Raveendran et al. |
| 2008/0106642 A1 * | 5/2008 | Srinivasan et al. ............ 348/452 |

FOREIGN PATENT DOCUMENTS

| | | |
|---|---|---|
| EP | 1 383 337 A2 | 1/2004 |
| GB | 2 277 006 A | 10/1994 |
| JP | 06-326980 | 11/1994 |
| JP | 2000-222587 | 8/2000 |
| JP | 2004-056824 | 2/2004 |
| JP | 2004-503951 | 2/2004 |
| JP | 2006-303910 | 11/2006 |
| WO | 99/52297 | 10/1999 |

\* cited by examiner

DETECTING REPETITION IN DIGITAL VIDEO

This application is the U.S. national phase of International Application No. PCT/EP2008/058146 filed 26 Jun. 2008, which designated the U.S. and the entire contents of which is hereby incorporated by reference.

TECHNICAL FIELD

The invention is related to video coding in general, and in particular to pre-processing video to detect repeated pictures.

BACKGROUND

For many decades the film industry has used a picture or frame rate of 24 images per second (i.e. 24 Hz) to capture moving material. When television technology was emerging in the 1930s, different frame rates were chosen despite the existence of this early film standard. Indeed, whilst the film standard of 24 Hz was effectively a worldwide standard, television picture rates polarised into two standards based on the frequencies of the power distribution systems.

In Europe, and many other regions of the world, the power frequency is 50 Hz, and hence in these regions the television frame rate is usually 25 Hz. This is because television is primarily an interlaced display format, i.e. one that displays alternating fields (TOP and BOTTOM) to produce the moving picture. This is shown more clearly in FIG. 1. Therefore, for television, when the interlaced field display rate is at the frequency of the power system, i.e. 50 Hz, the resultant frame rate is half that, namely 25 Hz.

The difference between the two frame frequencies (24 Hz versus 25 Hz) is small and so film can be easily presented on European televisions at 25 Hz by running the film slightly faster than normal (about 4.16% faster). In this case, although the sound pitch is almost a semitone sharp, viewers still find it acceptable. Thus there is no significant problem associated with presenting film in the 50 Hz television environment.

However, in the United States of America, and some other regions where the USA's power frequency has been adopted, the power frequency is 60 Hz, so the field rate of televisions in these regions is 60 Hz, and the frame rate is 30 Hz. This latter frame frequency was modified to become 29.97 Hz when colour television (the system called National Television System Committee, NTSC) was adopted in the 1950s and this frame frequency has been used ever since.

The discrepancy between the original 24 Hz film rate, and the current NTSC frame rate of 29.97 Hz, is approx 25%, and as a result of this large discrepancy in frame rates, the presentation of films on NTSC television (or other 60 Hz television formats) is not straightforward, and it cannot be done simply by speeding up the film playback rate.

Figure 1:
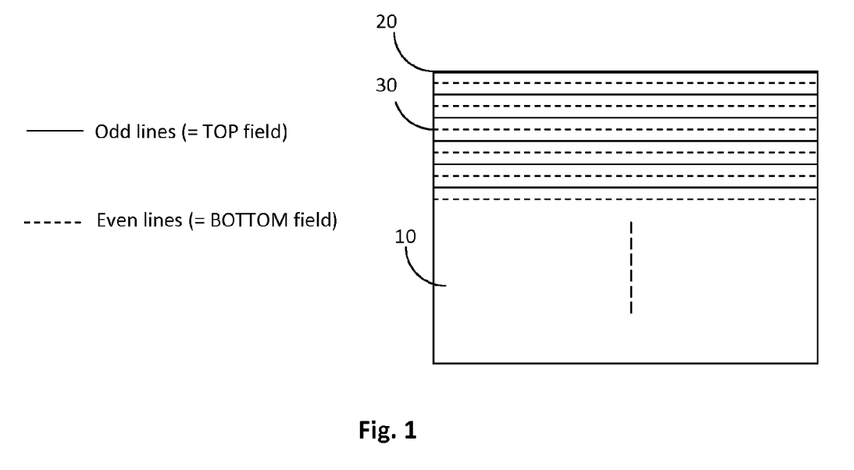
FIG. 1 shows how a frame of video is physically formed out of two interlaced fields.

As mentioned in brief above, all current standard definition television systems use a system of interlace, where each complete television frame is transmitted in two parts called fields. FIG. 1 shows how a video frame 10 is formed of two fields; a TOP field 20 comprising the odd lines, and a BOTTOM field 30 comprising the even lines.

The first field to be transmitted comprises the odd numbered lines of the raster scan and the second field to be transmitted comprises the even numbered lines of the raster scan.

Figure 2:
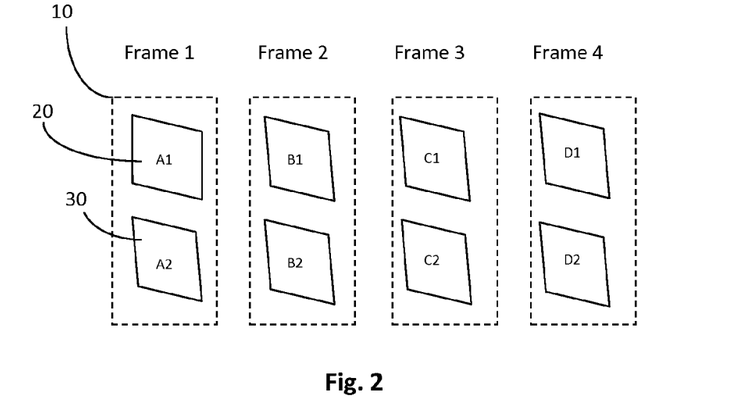
FIG. 2 shows the standard layout of four frames of film in terms of frames and fields.

FIG. 2 shows four frames of a film sequence having eight fields, i.e. the normal sequence of fields in an exemplary four frame long portion of video.

The method of mapping the 24 frames per second that are captured during film production onto the 29.97 frames per second of an NTSC TV system is called "3:2 pull down". This involves the exact repetition of some of the fields of some television frames in a pattern that ensures that 24 film frames occupy the same time as the 30 corresponding television frames, i.e. 4 film frames to each set of 5 television frames. The small difference between 29.97 and 30 Hz is not material to this process.

Figure 3:
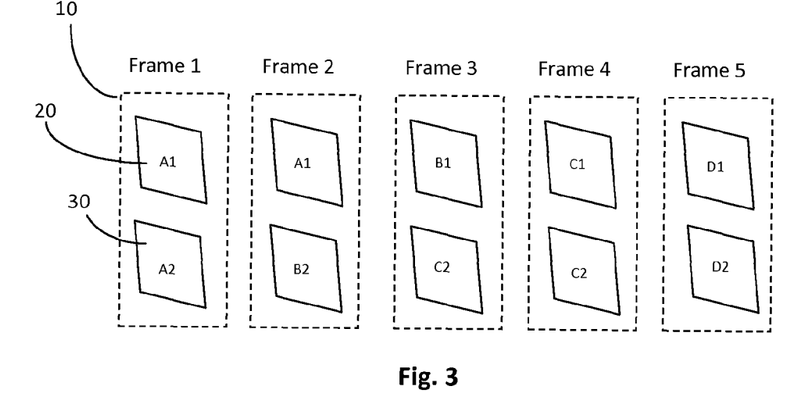
FIG. 3 shows how the four frames of film from FIG. 2 are converted into five frames using the 3:2 pulldown process.

In the 3:2 pull down process, the 24 film frames (per second) are distributed to 30 video frames (per second), arranged as 60 separate television or video fields. At the start of each 3:2 sequence, a given frame of the film is scanned and placed on 3 fields of the video output, where the third field is a repeat of the first and comprises the first field of a new television frame. Then, the next film frame is scanned and placed on the next two television fields, but in reverse order; that is, the bottom field goes first to complete the second television frame and the top field goes last to form the first field of a third television frame. The third film frame is scanned and placed (i.e. mapped) on to the next three fields with another repeated field, with the fourth film frame being on two television frames, in reverse order, etc. The result is that every 4 film frames are converted in to 5 television frames (or 10 fields of NTSC interlaced video) in a pattern of television field distribution like that shown in FIG. 3.

The application of video compression to such a sequence of television fields presents specific problems. For example, in sequences which have had a 3:2 pull down process applied, if frame based coding is used, then a quarter of all television frames would consist of two fields from different source film frames, leading to poor compression and unwanted visible artifacts. Meanwhile, if field based coding is used, two redundant fields caused by the field repetition are unnecessarily re-coded in every 10 fields, resulting in inefficient compression.

Consequently, the syntax of MPEG2 digital video provides means to avoid this inefficiency using flags, so that such sequences are coded at 24 frames per second and the field repetition is performed at the decoder. These flags are: Repeat First Field (RFF) and Top Field First (TFF). Similarly, Supplemental Enhanced Information (SEI) messages are used in H.264 to indicate repetitive fields. So it is highly desirable to be able to reliably detect the repetitive fields in video sequences to improve the compression achieved, as well as to improve the perceived video quality.

Some 3:2 detection schemes exist that require prior indication of the format of the input video, and assume that all the video is consistently in the same format and quality. Thus, in known practical hardware for specifically detecting the 3:2 sequence, it would be known de facto that the input is already in that form.

However, this pre-indication of the type of input video is not much use in a pre-processing environment of a video compression encoder, where the video signal format of the sources can be arbitrarily mixed in nature, i.e. it may contain inserts from several different sources edited together, where some material is derived from film stock and has been though 3:2 conversion from film, other portions are native television video portions which are naturally interlaced, and still further portions may be progressive in origin. The pre-processor must therefore be able to deal with all these format characteristics with no prior knowledge of the signal format or behaviour, and without degrading the picture quality.

Figure 4:
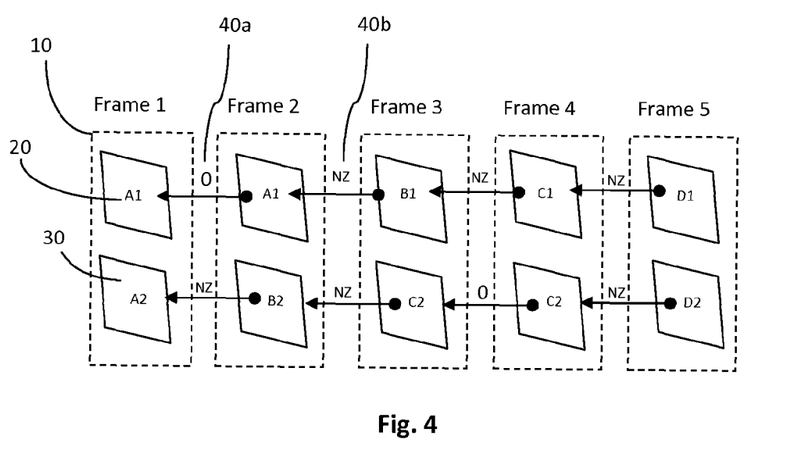
FIG. 4 shows the temporal difference computations used between same parity fields in current and next pictures, to detect 3:2 pulldown sequences.

For sequences without noise, repetitive fields can be easily detected in interlaced video by computing the temporal difference between fields having the same parity—that is either Top or Bottom field, in adjacent frames. For example, as shown in FIG. 4, comparison of repetitive fields produces zero temporal difference (40a), whereas comparison of non-repetitive fields produce non-zero temporal difference (40b), thereby providing the opportunity to identify a definitive repetitive pattern in temporal difference values over a 10 field period, and hence the 3:2 pull down sequence can be identified.

However, in the presence of noise, as well as other impairments to the video sequence, such as film weave, etc, the temporal difference between repetitive fields will not be zero. The difference value will depend on the variance of these accumulated impairments, dominated by the noise.

For sequences with slow motion activity and noise, merely observing the values of temporal difference could lead to false triggers, or missing triggers of the repetitive fields. This is because the non-repetitive fields could also produce small temporal difference values for such slow motion sequences. Any existing solutions which operate in the time domain by analysing differences between repeating fields are subject to degradation due to noise, hence it is highly desirable that any new repetitive field detection method provides improved performance that is highly robust against noise for slow motion sequences.

Although there exist methods to detect the 3:2 pull down sequences, no method efficiently detects the repetitive fields in the presence of strong noise levels typically present in the source video sequences.

For example, U.S. Pat. No. 6,058,140, uses the combination of magnitude and correlation between motion vectors of respective blocks in adjacent fields to identify the 3:2 pull down pattern.

U.S. Pat. No. 5,852,473 uses circuitry in which current and prior top and bottom fields are input to respective Sum of Absolute Difference (SAD) circuits, the outputs of which are then subtracted to produce a difference signal. The difference signal is input to a spike detector which detects and filters out spikes caused by scene changes and which detects the maximum and minimum values of the difference signal over the last five frames. These maximum and minimum values are further correlated and processed to generate a flag signal indicative of 3-2 pull down material.

U.S. Pat. No. 7,203,238 uses field motion vectors determined by a motion estimator and compares the field motion vectors to a threshold to determine whether a repeated field exists.

U.S. Pat. No. 7,180,570 uses fuzzy logic to detect 3:2 pulldown sequences, but uses a field or frame difference and SAD based method. The fuzzy logic looks at the patterns of fields expected of 3:2 pulldown sequences over the five frames systematically involved.

All the above mentioned methods do not take the noise levels present in the input video sequences properly into consideration, and hence could produce incorrect results in the presence of noise. For example, they may compute the magnitude of the noise component of the television signal by calculating the average value of the luminance component. This approach assumes that the video signal has a larger noise component when a darker scene is filmed (i.e. that the noise levels are higher for dark scenes compared to bright scenes). So, in this approach, the threshold value is set to be a low value if the luminance average value is high, but is set to a high value if the luminance average value is low.

It is therefore an object of the present invention to deal with such matters and improve the practical performance of MPEG2 coding.

SUMMARY

In a first aspect of the present invention, there is provided a method of detecting repeated pictures in a sequence of video picture data, each picture of said video picture data comprising a plurality of macroblocks, the method comprising performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level, providing a noise threshold value based upon the zero motion vector sum of absolute difference values from the top level of the hierarchical motion estimation, accumulating the best motion vector sum of absolute difference values for macroblocks having best motion vector sum of absolute difference values greater than the noise threshold value to provide a distortion value for the picture, and setting a repeat flag dependent upon the distortion value.

In this way, a more robust and noise resistant repeated picture detection method is provided, which re-uses certain circuitry typically already included in video pre-processing or encoding hardware.

Optionally, at each level, the hierarchical motion estimation is carried out on a current picture under test and a previous picture for comparison to the current picture, and the hierarchical motion estimation comprises low pass filtering the current picture and previous picture, decimating both the current picture and previous picture by a first predetermined value, and performing full search motion estimation on the filtered and decimated current picture and the filtered and decimated previous picture to provide said best motion vectors for each macroblock, best motion vector sum of absolute difference values for each macro block and zero motion vector sum of absolute difference values for each macroblock.

Optionally, the step of performing the full search motion estimation comprises performing the full search motion estimation on a search window.

Optionally, the search window is ($\pm16,\pm12$).

Optionally, the full search motion estimation is performed around (0,0) for the top level, and is performed around the best motion vectors from the higher level for each lower level. Optionally, hierarchical motion estimation may only be used at its highest level (i.e. at the maximum level of decimation) to derive the noise threshold value, with other forms of motion estimation used in the subsequent portions of the overall method.

Optionally, the hierarchical motion estimation is carried out to three levels.

Optionally, the step of providing a noise threshold value further comprises summing the zero motion vector sum of absolute difference values from a top level of the hierarchical motion estimation to provide a noise estimate threshold value, dividing the noise estimate threshold value by a second predetermined value, and adding an offset value.

Optionally, the step of providing a noise threshold value further comprises limiting the noise threshold value to a third predetermined value.

Optionally, the method further comprises detecting a sequence of repeated and non-repeated pictures displaying a typical 3:2 pulldown repetition sequence from an output sequence of repeat flags.

Optionally, the accumulating step further comprises ignoring accumulated best motion vector sum of absolute difference values below a fourth predetermined value.

Optionally, the picture comprises a TOP field and BOTTOM field, and the step of accumulating comprises carrying out the following pseudo code:

```
Field_Distortion = 0;
For all macroblocks in a Field
    If(Best_MV_SAD > Field_Noise_Threshold)
        Field_Distortion += Best_MV_SAD;
    if(Field_Distortion > fourth predetermined value)
        Field_Distortion = Field_Distortion – fourth predetermined value
    else
        Field_Distortion = 0;
    if(Field_Distortion < fifth predetermined value)
        Field_Distortion = fifth predetermined value /(1+
        Field_Distortion);
    else
        Field_Distortion = 1;
``` for the TOP fields or BOTTOM fields separately.

Optionally, the step of detecting a sequence of repeated and non-repeated fields comprises carrying out the following pseudo code:

```
If ((Field_Distortion * sixth predetermined value/(Field_Sum +
Field_Distortion)) > seventh predetermined value AND
Field_Distortion > eighth predetermined value AND Previous
Field_Repetitive_Flag is at least 4 Fields away)
    Set Field_Repetitive_Flag to 1;
Otherwise set Field_Repetitive_Flag to 0;
``` for the TOP fields and BOTTOM fields separately.

Optionally, the picture comprises a frame, and the accumulating step comprises carrying out the following pseudo code:

```
Frame_Distortion = 0;
For all macroblocks in a Frame
    If( Best_MV_SAD > Frame_Noise_Threshold)
        Frame_Distortion += Best_MV_SAD;
    if(Frame_Distortion > fourth predetermined value)
        Frame_Distortion = Frame_Distortion – fourth predetermined
        value
    else
        Frame_Distortion = 0.
```

Optionally, the step of detecting a sequence of repeated and non-repeated frames comprises carrying out the following pseudo code:

```
If (Frame_Distortion)) < ninth predetermined value;
    Set Frame_Repetitive_Flag to 1.
```

Optionally, the hierarchical motion estimation is used to provide the noise threshold value, and any form of motion estimation is used to provide the best motion vector sum of absolute difference values in the subsequent accumulation step.

In a second aspect of the invention, there is provided a video pre-processor apparatus for pre-processing a sequence of video picture data to detect repeated pictures, said apparatus comprising apparatus adapted to carry out any of the above-described method.

In a third aspect of the invention, there is provided a video pre-processor apparatus for pre-processing a sequence of video picture data to detect repeated pictures, said apparatus comprising a hierarchical motion estimation circuit, noise estimation circuit, a one picture delay, and decision logic adapted to set a Repeat Flag when a repeated picture is detected using a noise threshold value derived by the noise estimation circuit using an output of the hierarchical motion estimation circuit.

In a fourth aspect of the invention, there is provided a computer-readable medium, carrying instructions, which, when executed, causes computer logic to carry out any of above-described method.

In a particular embodiment of the invention designed for use with standard definition video the predetermined values are set as follows: First predetermined value is 2; Second predetermined value is 16; Third predetermined value is 3072; Fourth predetermined value is 1024; Fifth predetermined value is 65586; Sixth predetermined value is 384; Seventh predetermined value is 176; Eighth predetermined value is 32768; ninth predetermined value is 4092; and an offset value of 1280

BRIEF DESCRIPTION OF THE DRAWINGS

A method of pre-processing video data will now be described, by way of example only, with reference to the accompanying drawings in which.

DETAILED DESCRIPTION

An embodiment of the invention will now be described with reference to the accompanying drawings in which the same or similar parts or steps have been given the same or similar reference numerals.

One way to improve the reliable detection of repeating sequences of television fields or frames is to improve the noise resilience of the field/frame comparison process. This is possible through the use of hierarchical motion estimation as a part of the detection process. By its very nature, hierarchical motion estimation is noise resilient because it works on a set of sums which are averaged and effectively operates as a correlating filter. Current industry standard compression algorithms such as MPEG 2 and MPEG 4 segment the picture into so called macroblocks, typically comprised of square assemblies 16 by 16 pixels in size. Each of these macroblocks is a basic unit of pixel grouping that enables the motion estimation to contribute significantly to the success of the compression process. By using this technique, the 3:2 detection problem is considerably eased because the analysis of the image behaviour is locally detailed and reliable in the presence of noise.

Repetitive fields can be detected by performing motion estimation between same parity fields (TOP or BOTTOM) of the source video, as shown in FIG. 4. Motion estimation between repetitive fields would result in zero or relatively low distortion compared to motion estimation between non repetitive fields. Distortion is defined as the sum of the Sum of Absolute Differences (SADs) for all the macroblocks of the field under consideration.

The Sum of Absolute Differences is defined as the absolute value of the difference between each pixel in the original macroblock and the corresponding pixel in the macroblock being used for comparison. These absolute pixel differences are then summed together to provide a metric of block similarity.

In the absence of noise, repetitive fields would result in a zero SAD values for all macroblocks and hence zero distortion. However, in the presence of noise, SAD values of the repetitive fields would depend on the noise variance in the fields under test and hence the distortion is based on the intensity of the noise. If the noise level can be estimated, a threshold based on this noise level can be determined and used to assist in discarding the SAD values below the threshold. The measured distortion would then be low for repetitive fields compared to non repetitive fields. This process enables the detection of repetitive fields even in the presence of considerable noise.

In summary, the noise thresholds are derived from the highest level of the hierarchical motion estimation, as detailed below. Once the noise estimates are produced, any form of motion estimation may be used thereafter. However, since hierarchical motion estimation is used to derive the noise thresholds, and it is a computationally efficient method of motion estimation, the preferred embodiment makes use of hierarchical motion estimation throughout.

Figure 5:
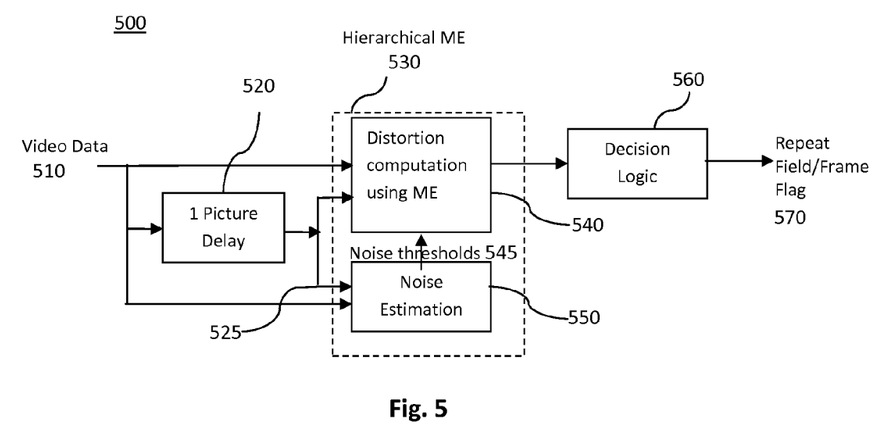
FIG. 5 shows a block schematic diagram of circuitry for detecting repeated frames or fields according to an embodiment of the invention.

A schematic block diagram of an embodiment of the hardware for carrying out the proposed method for repetitive field/frame detection is shown in FIG. 5, and it is explained in more detail in the following sections. The following hardware is typically provided as a pre-processing stage prior to encoder proper, i.e. the output of the pre-processor guides how the encoder deals with each field or frame of the encoded video.

As shown in FIG. 5, the repetitive picture detection hardware 500 comprises a video data input 510 providing the video data to be analysed to a hierarchical motion estimation circuit 530, both directly, and via a one picture delay 520. The output of the hierarchical motion estimation circuit 530 passes through decision logic 560, which decides whether to assert the Repeat Field/Frame Flag 570 used by the video encoder (not shown) further down the encoding line, dependent upon the output of the hierarchical motion estimation circuit 530, as discussed in more detail below.

The hierarchical motion estimation circuit 530 comprises a motion estimation distortion computation circuit 540 and noise estimation circuit 550. The noise estimation circuit 550 takes both the video data 510 (i.e. current picture) and the one picture delayed video data 525 (i.e. previous picture) as inputs, and provides estimated noise thresholds 545 as an output, which is fed into the motion estimation distortion computation circuit 540. Meanwhile, the motion estimation distortion computation circuit 540 uses the one picture delayed video data 525 (previous picture), along with the video data 510 (i.e. current picture data) and estimated noise thresholds 545 to guide the decision logic into making the correct determination of repeated fields/frames.

FIG. 5 shows the preferred embodiment, where hierarchical motion estimation is used throughout. If an alternative motion estimation method is used after the noise thresholds have been determined from the top level of the hierarchical motion estimation process, then the video data 510, delayed video data 525 and the noise thresholds 545 will be fed into circuitry adapted to carry out the selected motion estimation method instead. This would be typically placed between the hierarchical motion estimation circuit 530, and decision logic 560.

In more detail, motion estimation is performed on the current picture with respect to the previous picture by dividing the picture into 16×16 macroblocks. A Best Motion Vector SAD value for every macroblock is computed and it is counted as part of the distortion if its value is greater than the noise thresholds 545 provided by the noise estimation circuit 550.

The Best Motion Vector SAD value is the Sum of Absolute Differences value for the macroblock under test when it is placed at the position in the current picture (i.e. the most recent picture) considered to be the best match for where the macroblock from the previous picture has moved to.

For repetitive fields/frames, motion estimation distortion would be very low compared to non repetitive fields/frames. Once the noise thresholds have been determined from the top level of the hierarchical motion estimation, any suitable motion estimation method can be used in the further processing steps. However, in the preferred embodiment, hierarchical model based motion estimation is used to perform the motion estimation between same parity fields/frames of the current and previous pictures, as the hierarchical motion estimation process is relatively less expensive to implement in hardware than other forms of motion estimation, and it is already used in estimating the noise levels. Typically, noise level measurement circuitry, i.e. noise estimation circuitry 550, is incorporated into the motion estimation circuitry to reduce the computational complexity.

Figure 6:
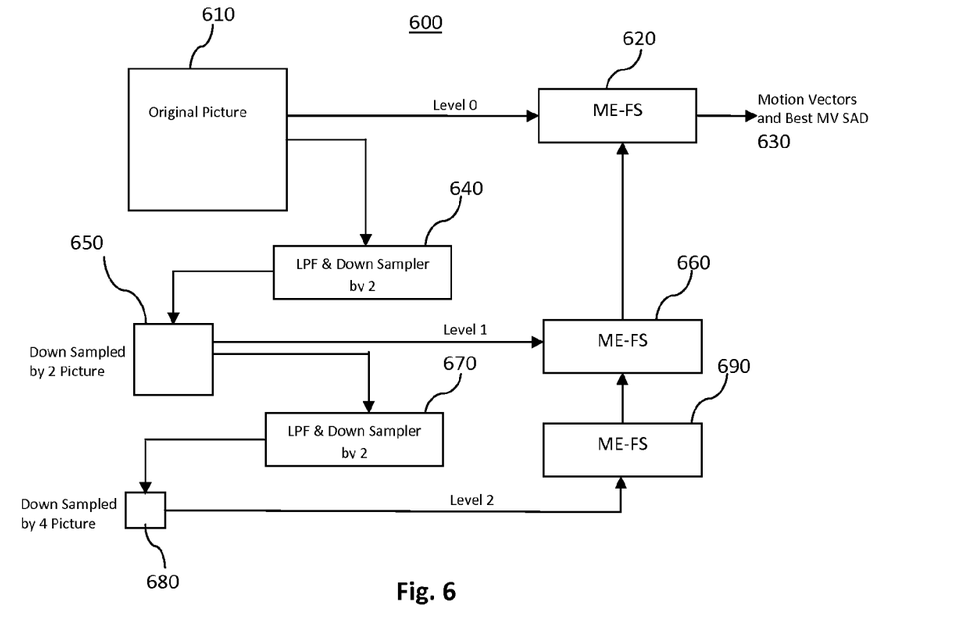
FIG. 6 shows a block schematic diagram of an exemplary embodiment of the hierarchical motion estimation portion of the proposed pulldown detection method.

An embodiment of the hierarchical motion estimation process is shown FIG. 6.

In hierarchical motion estimation 600, pyramids of the images are constructed by low pass filtering and decimating (640, 670) the original sequence of fields/frames by two in both horizontal and vertical directions for each level. Hence, in the described embodiment having three levels, the original picture 610 is decimated by two 640 for level 1 and then further decimated by two 670 for level 2.

Hierarchical motion estimation always includes a low pass filtering step before decimation; otherwise the decimation process would produce unwanted high frequency components in the decimated signal due to aliasing.

Full search (FS) motion estimation 660/690 is performed on the filtered and decimated images 650/680 at the higher levels (i.e. levels 1 and 2). At the lowest level (level 0), full search motion estimation 620 is performed on the full image 610.

The higher levels provide a seed motion vector for lower levels, where the search will be performed around the seed motion vector. In the preferred embodiment, at all levels, full search motion estimation is performed on a search window of (±16, ±12). However, other search window sizes may be used according to the needs of a particular implementation (in particular, how much processing power is available).

In the embodiment described, the hierarchical motion estimation is performed at three levels and each level is explained in detail below. However, as the skilled person would appreciate, more or less levels may be used in the hierarchical motion estimation of a particular implementation, according to the specific requirements of that implementation.

The exact form of the repeating field/frame detection method depends on whether the source video material is interlaced (i.e. field based) or progressive (i.e. frame based). Accordingly, the following description will be segregated into interlaced and progressive portions. The hardware is reset when a format change is encountered.

The hierarchical motion estimation starts off at the top (highest) level, in this case the third level (starting from level 0, i.e. Level 2).

Level 2 Motion Estimation

1. Both current and previous reference pictures (i.e. the two pictures being compared to determine whether they are repeated pictures) are low pass filtered and decimated by 4 in both horizontal and vertical direction using a suitable filter. For example, a 13 tap filter with the coefficients {17, 26, 35, 44, 51, 55, 56, 55, 51, 44, 35, 26, 17} can be used as the low pass filter. Higher value tap filters may be used to provide a more accurate decimator. However, using higher value tap filters would be at the expense of computational/hardware complexity.

2. Full search motion estimation on a search window of (±16, ±12) is performed around the origin (0, 0). The Best Motion vectors, and their corresponding SAD values, along with the Zero Motion Vector SAD values are noted down for each macroblock.

The Zero Motion Vector SAD value is the Sum of Absolute Differences value for the macroblock under test when it is not moved at all between the previous picture and the current picture, i.e. the motion vector was zero.

Interlaced Content

Top_Field_Noise_Estimate is defined as the sum of Zero Motion Vector SADs at Level 2 for the TOP field, and Bot_Field_Noise_Estimate is defined as the sum of Zero Motion Vector SADs at Level 2 for the BOTTOM field.

Progressive Content

Frame_Noise_Estimate is defined as the sum of Zero Motion Vector SADs at Level 2 for the whole frame.

At Level 2, as the pictures are low pass filtered by a 13 Tap filter and decimated by 4, the Zero Motion Vector SAD values give an estimate of the noise levels present in the video sequence under test and which potentially contains repetitive fields or frames. The Zero Motion Vector SADs provide this noise estimate, due to the averaging nature of their calculation.

Noise thresholds are limited to distinguish between repeated field/frames with noise, and non repeated fields.

Interlaced Content

From the Top_Field_Noise_Estimate and Bot_Field_Noise_Estimate values, field noise thresholds are derived as follows:

Top_Field_Noise_Threshold=1280+(Top_Field_Noise_Estimate/16)

Bot_Field_Noise_Threshold=1280+(Bot_Field_Noise_Estimate/16)

The above threshold calculations include an offset value of 1280. However, an offset value between 512 and 2400 may be used. The offset value 1280 was found to produce the least false detections for typical picture noise levels encountered in real world tests.

The choice of noise estimator divisor is arbitrary. However, the value of 16 used above has been found to provide particularly satisfactory results in real world tests of the method with standard definition input video picture data. The divisor size is linked to the resolution of the input video picture data, and hence should be scaled according to the resolution. For example, if the input video data was High Definition video (e.g. approx 4 times the resolution of standard definition video), the divisor would be scaled up accordingly to 64.

As mentioned previously, noise thresholds are limited to distinguish between repeated field/frames with noise, and non repeated fields, thus the limited field thresholds are calculated as follows:

```
If(Top_Field_Noise_Threshold > 3072)
{
    Top_Field_Noise_Threshold = 3072
}
If(Bot_Field_Noise_Threshold > 3072)
{
    Bot_Field_Noise_Threshold = 3072
}
```

In the above way, the noise thresholds are limited to 3072. This threshold value is derived from tests on real world video data, and is found by experiment to be a reasonable compromise on accuracy. Although the choice of limited threshold value used is arbitrary, it shouldn't be too large. It should be less than the maximum SAD value of the repetitive frame/field. Otherwise repetitive fields/frames also produce zero temporal distortion after motion estimation distortion accumulation.

Progressive Content

From the frame picture noise estimate, a frame noise threshold is derived as follows:

Frame_Noise_Threshold=1280+(Frame_Noise_Estimate/32)

Again, an offset is used, and the same principles of threshold size, as mentioned above with respect to the calculation of field thresholds, applies equally here (i.e. can be between 512 and 2400).

The choice of divisor for progressive format input video is limited in the same way as that for interlaced video (i.e. the choice is arbitrary, but scales according to the resolution of the video). However, since progressive video operates on whole frames, which are equivalent to two fields, the value is double that used for interlaced video. Accordingly, in real world tests, it was found that the value of 32 produced the most satisfactory results.

From the frame noise threshold, the final limited frame threshold is set as follows:

```
If(Frame_Noise_Threshold > 3072)
{
    Frame_Noise_Threshold = 3072
}
```

Again, the limited threshold value is determined from real world tests, and similar rules apply to its choice, as was discussed above with respect to the interlaced version of the method.

Level 2 motion estimation provides the seed motion vectors for Level 1 motion estimation.

Level 1 Motion Estimation

1) Both source and reference pictures are low pass filtered and decimated by 2 in both horizontal and vertical directions using the same 13 tap filter as used previously. A different filter may be used instead.

2) Full search motion estimation on a search window of (±16, ±12) is performed around the Level 2 Best Motion Vector, and its corresponding level 1 Best Motion vectors and SAD values are noted down for each macroblock.

Level 1 motion estimation provides the seed motion vectors for Level 0 motion estimation.

Level 0 Motion Estimation

1) Full search motion estimation on a search window of (±16, ±12) is performed around the Level 1 Best Motion Vector, and its corresponding level 0 Best Motion vectors and SAD values are noted down for each macroblock.

Interlaced Content

Temporal distortion for top field and bottom field are computed from Level 0 motion estimation Best Motion Vector SADs.

An exemplary pseudo code for the TOP field portion of the method is shown below:

```
Top_Field_Distortion = 0;
For all macroblocks in a Top Field
    If( Best_MV_SAD > Top_Field_Noise_Threshold)
        Top_Field_Distortion += Best_MV_SAD;
```

Where the += is an accumulate operation.

The above first (primary) portion accumulates the Best motion vector SAD values for macroblocks which are above the noise threshold, to produce a Top_Field_Distortion value.

```
if(Top_Field_Distortion > 1024)
    Top_Field_Distortion = Top_Field_Distortion − 1024
else
    Top_Field_Distortion = 0;
```

This second portion removes smaller values of distortion (below 1024 in the example shown—this value was derived from real world tests on sample standard definition input video data), which effectively means the smaller values are ignored (the smaller values may have been spurious). The output distortion value of this portion is therefore either set to 0, or the original accumulated distortion value, less the threshold limit of 1024.

```
if(Top_Field_Distortion < 65536)
    Top_Field_Distortion = 65536/(1+ Top_Field_Distortion );
else
    Top_Field_Distortion = 1;
```

This third portion turns low distortion values into high distortion values, and high distortion values into low distortion values, to ensure more reliable detection of repeated fields/frames. This part of the method effectively inverts what is being looked for—i.e. a field with high distortion will actually be set to have low distortion after this portion, and hence to find a field with high distortion, the method involves looking for fields having low distortion after this third portion of pseudo code.

The second and third portions of the above pseudo code are not strictly required. However, they improve the accuracy of the method by helping to remove spurious intermediate results from affecting the final result.

Figure 7:
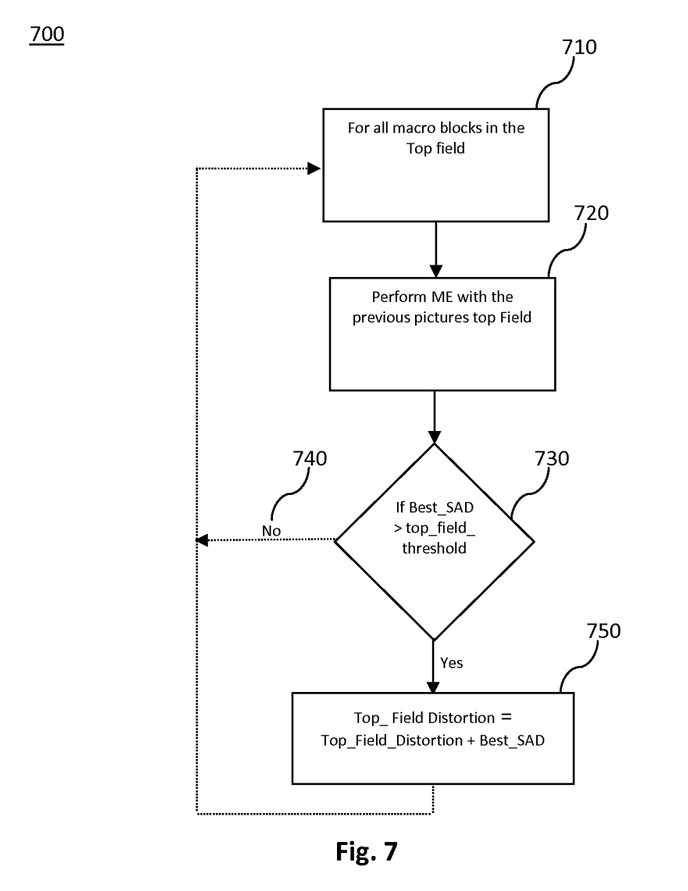
FIG. 7 shows a flowchart of the TOP field distortion computation portion of the method according to an embodiment of the invention.

FIG. 7 shows a flowchart of the above described TOP field distortion computation portion of an embodiment of the invention, as applied to a current picture. In particular, FIG. 7 shows for all macroblocks in the TOP field 710 of the current picture, motion estimation is carried out compared to the TOP field of the previous picture 720. The Best Motion Vector SAD for each macroblock is tested to detect whether it is larger than the limited TOP field threshold 730. If it is, the Best Motion Vector SAD is added to the running total of accumulated Best Motion Vector SADs 750. If the Best Motion Vector SAD is less than the limited TOP field threshold 740, it is ignored in the accumulation, and the method moves on to the next macroblock.

An exemplary pseudo code for the BOTTOM field portion of the method is:

```
Bot_Field_Distortion = 0;
For all macroblocks in a Frame
    If( Best_MV_SAD > Bot_Field_Noise_Threshold)
        Bot_Field_Distortion += Best_MV_SAD;
if(Bot_Field_Distortion > 1024)
    Bot_Field_Distortion = Bot_Field_Distortion − 1024
else
    Bot_Field_Distortion = 0;
if(Bot_Field_Distortion < 65536)
    Bot_Field_Distortion = 65536/(1+ Bot_Field_Distortion);
else
    Bot_Field_Distortion = 1;
```

The same principles apply for this BOTTOM field distortion calculation pseudo code, as was stated above in respect of the TOP field distortion pseudo code.

Figure 8:
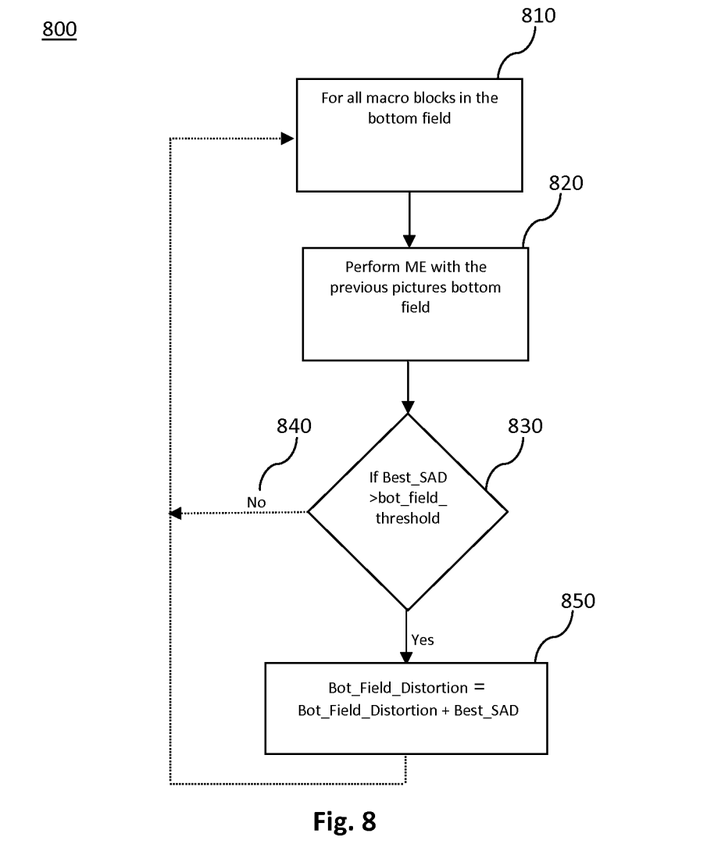
FIG. 8 shows a flowchart of the BOTTOM field distortion computation portion of the method according to an embodiment of the invention.

FIG. 8 shows a flowchart of the above described BOTTOM field distortion computation portion of an embodiment of the invention. In particular, FIG. 8 shows for all macroblocks in the BOTTOM field 810 of the current picture, motion estimation is carried out compared to the BOTTOM field of the previous picture 820. The Best Motion Vector SAD for each macroblock is tested to detect whether it is larger than the limited BOTTOM field threshold 830. If it is, the Best Motion Vector SAD is added to the running total of accumulated Best Motion Vector SADs 850. If the Best Motion Vector SAD is less than the limited BOTTOM field threshold 840, it is ignored in the accumulation, and the process moves on to the next macroblock.

Using Top_Field_Distortion and Bot_Field_Distortion values, as calculated above, which corresponds to TOP field and BOTTOM field motion estimation distortions, repetitive fields can be detected by observing the definitive patterns of the distortion. For example, in the case of 3:2 Pull down, previous four pictures TOP field distortion and BOTTOM field distortion are used in conjunction with the current picture TOP field distortion and BOTTOM field distortion to detect repetitive fields. This is to say, a Repeat Frame Flag output of " . . . 00001 . . . " for the respective 5 frames would indicate the detection of a 3:2 pulldown sequence.

However, any repetition of fields or frames may be detected in this way, not just that resultant from the 3:2 pulldown process. Hence, the herein disclosed method may be used to detect any repetition of fields/frames, to flag them as such, so that the encoding process can take this repetition into account, and improve the coding efficiency as a result.

Top_Sum and Bot_Sum are defined as the sum of the four previous Top_Field_Distortions and Bot_Field_Distortions, respectively. The method to find the 3:2 Pull down sequence is then as follows:

Pseudo Code:

```
TOP field:
If ((Top_Field_Distortion *384/(Top_Sum + Top_Field_Distortion)) >
176 AND
Top_Field_Distortion > 32768 AND Previous
TOP_Field_Repetitive_Flag is at least 4 Fields away )
    Set TOP_Field_Repetitive_Flag to 1
Otherwise TOP_Field_Repetitive_Flag is set to 0.
BOTTOM field:
If ((Bot_Field_Distortion *384/(Bot_Sum + Bot_Field_Distortion)) >
176 AND
Bot_Field_Distortion > 32768 AND Previous
BOTTOM_Field_Repetitive_Flag
is at least 4 Fields away )
    Set Bot_Field_Repetitive_Flag to 1
Otherwise BOTTOM_Field_Repetitive_Flag is set to 0.
```

Both the above pseudo code portions allow the method for detecting repeated fields/frames to accommodate having static fields in amongst the input video picture data such that there are no false detections of 3:2 pulldown sequences due to the static fields being present.

The above mentioned value of 32768 may take a value in the range of 8192 to 32768. The values 384 and 176 are related. For example, if threshold1 is set to be 384, then the approximate range of values for threshold2 is between (0.8*threshold1) to (0.4*threshold1), which is the present case was set to be 176.

The constants used in the above pseudo code (384, 176 and 32768) are derived from real world tests of the method.

Progressive Content

Temporal distortion for each frame is computed from Level 0 motion estimation Best Motion Vector SADs as follows:

```
Frame_Distortion = 0;
For all macroblocks in a Frame
    If( Best_MV_SAD > Frame_Noise_Threshold)
        Frame_Distortion += Best_MV_SAD;
    if(Frame_Distortion > 1024)
        Frame_Distortion = Frame_Distortion – 1024
    else
        Frame_Distortion = 0;
```

Where += is the accumulate function

Figure 9:
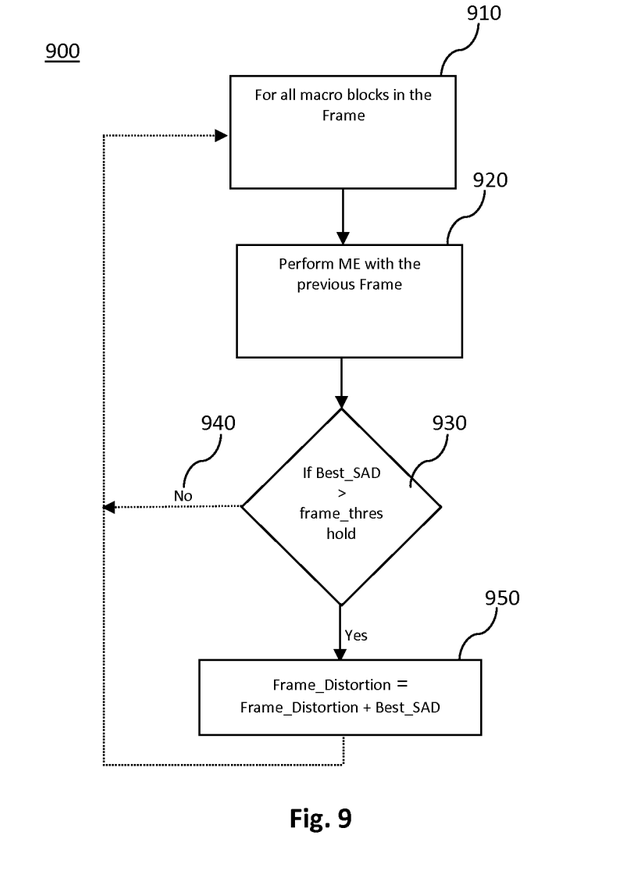
FIG. 9 shows a flowchart of the frame distortion computation portion of the method according to an embodiment of the invention.

FIG. 9 shows a flowchart of the above described frame distortion computation portion of an embodiment of the method according to the invention. In particular, FIG. 9 shows for all macroblocks in the frame 910 of the current picture, motion estimation is carried out compared to the previous frame 920. The Best Motion Vector SAD for each macroblock is tested to detect whether it is larger than the limited frame threshold 930. If it is, the Best Motion Vector SAD is added to the running total of accumulated Best Motion Vector SADs 950. If the Best Motion Vector SAD is less than the limited frame threshold 940, it is ignored in the accumulation, and the process moves on to the next macroblock.

Using the Frame_Distortion value, repetitive frames can be detected by observing very low Frame distortion for repetitive frames. For example, in the case of 3:2 pulldown, repetitive frames would give very low Frame_Distortion value.

Pseudo Code:

```
If (Frame_Distortion)) < 4096
    Set Frame_Repetitive_Flag to 1
```

Here, a threshold of 4096 has been chosen through experimentation with real world example standard definition video sequences. However, other values may be chosen according to the requirements of a particular implementation of the invention. For example, the threshold value of 4096 would need to be scaled according to the input video picture resolution.

The above described method has been developed and tested for all Pull down sequences in the pre-processing portion of a state of the art compression coder and it has been able to reliably detect the 3:2 pull down pattern for slow motion sequences with signal to noise values as low as 28 dB. This is a significant improvement on previous methods and techniques.

The improved pre-processing image analysis provided by this new method of detecting the 3:2 pull down sequence provides much better performance compared to previous, simpler methods and thus improves the compression performance of encoders. The previous methods don't address the issues involved in detecting repetitive fields in the presence of strong noise levels. The proposed method, which consists of inter frame noise level estimation circuitry, efficiently and accurately estimates the noise levels and adapts the thresholds to detect the repetitive fields. The method uses the hierarchical motion estimation circuitry, combined with the noise level measurement circuitry typically included in motion estimation stages itself, to reduce the extra computational burden involved in estimating the noise levels in the sequences.

The aforementioned method is typically carried out in a video pre-processor stage before the coding stage proper. However, it may be formed as part of the encoder itself. In the case where the method is carried out by the video pre-processor, the pre-processor analyses video picture data for encoding, and provides information, including the repeat flag, to the video encoder, such that the encoder is fore-warned of details about the video picture data, and can therefore optimise the output encoded video. In the particular case, the repeat flag is typically used to avoid the need to send repeated frames, therefore increasing efficiency of the encoded video.

The above described method maybe carried out by any suitably adapted hardware, and as such, the method may be embodied in a set of instructions, stored on a computer readable medium, which when loaded into a computer, Digital Signal Processor (DSP) or similar, causes the computer to carry out the hereinbefore described method.

Equally, the method may be embodied as a specially programmed, or hardware designed, integrated circuit which operates to carry out the method on image data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or location video uplink van supporting an in-the-field news team.

Another exemplary hardware embodiment of the present invention is that of a video pre-processor made out of an Application Specific Integrated Circuit (ASIC).

It will be apparent to the skilled person that the exact order and content of the steps carried out in the method described herein may be altered according to the requirements of a particular set of execution parameters, such as speed of detection, accuracy of detection, and the like. Accordingly, the claim numbering is not to be construed as a strict limitation on the ability to move steps between claims, and as such portions of dependent claims maybe utilised freely.

The invention claimed is:

1. A method of detecting repeated pictures in a sequence of video picture data, each picture of said video picture data comprising a plurality of macroblocks, the method comprising:

performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level;

providing a noise threshold value based upon the zero motion vector sum of absolute difference values from the top level of the hierarchical motion estimation;

accumulating the best motion vector sum of absolute difference values for macroblocks having best motion vector sum of absolute difference values greater than the noise threshold value to provide a distortion value for the picture; and setting a repeat flag dependent upon the distortion value;

wherein the step of providing a noise threshold value further comprises:

summing the zero motion vector sum of absolute difference values from a top level of the hierarchical motion estimation to provide a noise estimate threshold value;

dividing the noise estimate threshold value by a second predetermined value; and adding an offset value.

2. The method of claim 1, wherein, at each level, the hierarchical motion estimation is carried out on a current picture under test and a previous picture for comparison to the current picture, and the hierarchical motion estimation comprises:

low pass filtering the current picture and previous picture;

decimating both the current picture and previous picture by a first predetermined value; and performing full search motion estimation on the filtered and decimated current picture and the filtered and decimated previous picture to provide said best motion vectors for each macroblock, best motion vector sum of absolute difference values for each macro block and zero motion vector sum of absolute difference values for each macroblock.

3. The method of claim 1, wherein the step of performing the full search motion estimation comprises performing the full search motion estimation on a search window.

4. The method of claim 3, wherein the search window is (±16, ±12).

5. The method of claim 2, wherein the full search motion estimation is performed around (0,0) for the top level, and is performed around the best motion vectors from the higher level for each lower level.

6. The method of claim 1, wherein the hierarchical motion estimation is carried out to three levels.

7. The method of claim 1, wherein the step of providing a noise threshold value further comprises:

limiting the noise threshold value to a third predetermined value.

8. The method of claim 1, further comprising detecting a sequence of repeated and non-repeated pictures displaying a typical 3:2 pulldown repetition sequence from an output sequence of repeat flags.

9. The method of claim 1, wherein the accumulating step further comprises:

ignoring accumulated best motion vector sum of absolute difference values below a fourth predetermined value.

10. A method of detecting repeated pictures in a sequence of video picture data, each picture of said video picture data comprising a plurality of macroblocks, the method comprising:

performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level;

providing a noise threshold value based upon the zero motion vector sum of absolute difference values from the top level of the hierarchical motion estimation;

accumulating the best motion vector sum of absolute difference values for macroblocks having best motion vector sum of absolute difference values greater than the noise threshold value to provide a distortion value for the picture; wherein the accumulating step further comprises ignoring accumulated best motion vector sum of absolute difference values below a fourth predetermined value and setting a repeat flag dependent upon the distortion value;

wherein the picture comprises a TOP field and BOTTOM field, and the step of accumulating comprises carrying out the following pseudo code:

```
Field_Distortion = 0;
For all macroblocks in a Field
I    f(Best_MV_SAD > Field_Noise_Threshold)
         Field_Distortion += Best_MV_SAD;
if(Field_Distortion > fourth predetermined value)
         Field_Distortion = Field_Distortion − fourth predetermined
         value else
         Field_Distortion = 0;
```

-continued

```
if(Field_Distortion < fifth predetermined value)
        Field_Distortion = fifth predetermined value /(1+ Field_Distortion); else
        Field_Distortion = 1;
``` for the TOP fields or BOTTOM fields separately.

11. The method of claim 10, wherein the step of detecting a sequence of repeated and non-repeated fields comprises carrying out the following pseudo code:

```
If ((Field_Distortion * sixth predetermined value/(Field_Sum +
    Field_Distortion)) >
seventh predetermined value AND Field_Distortion > eighth
predetermined value AND
Previous Field_Repetitive_Flag is at least 4 Fields away)
    Set Field_Repetitive_Flag to 1;
Otherwise set Field_Repetitive_Flag to 0;
``` for the TOP fields and BOTTOM fields separately.

12. The method of claim 10, wherein the picture comprises a frame, and the accumulating step comprises carrying out the following pseudo code:

```
Frame_Distortion = 0;
For all macroblocks in a Frame
    If( Best_MV_SAD > Frame_Noise_Threshold)
        Frame_Distortion += Best_MV_SAD;
if(Frame_Distortion > fourth predetermined value)
    Frame_Distortion = Frame_Distortion - fourth predetermined
    value else
    Frame_Distortion = 0.
```

13. The method of claim 12, wherein the step of detecting a sequence of repeated and non-repeated frames comprises carrying out the following pseudo code:
If (Frame_Distortion))<ninth predetermined value;
Set Frame_Repetitive_Flag to 1.

14. The method of claim 1, wherein hierarchical motion estimation is used to provide the noise threshold value, and any form of motion estimation is used to provide the best motion vector sum of differences values in the subsequent accumulation step.

15. A video pre-processor apparatus for pre-processing a sequence of video picture data to detect repeated pictures, said apparatus comprising:
a hierarchical motion estimation circuit;
noise estimation circuit;
a one picture delay; and
decision logic adapted to set a Repeat Flag when a repeated picture is detected using a noise threshold value derived by the noise estimation circuit using an output of the hierarchical motion estimation circuit, the noise estimation circuit being configured to derive the noise threshold by:
    summing the zero motion vector sum of absolute difference values from a top level of the hierarchical motion estimation to provide a noise estimate threshold value;
    dividing the noise estimate threshold value by a second predetermined value; and
    adding an offset value.

16. A computer-readable non-transitory medium, carrying instructions, which, when executed, causes computer logic to carry out a method of detecting repeated pictures in a sequence of video picture data, each picture of said video picture data comprising a plurality of macroblocks, the method comprising:
    performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level;
    providing a noise threshold value based upon the zero motion vector sum of absolute difference values from the top level of the hierarchical motion estimation;
    accumulating the best motion vector sum of absolute difference values for macroblocks having best motion vector sum of absolute difference values greater than the noise threshold value to provide a distortion value for the picture; and
    setting a repeat flag dependent upon the distortion value;
    wherein the step of providing a noise threshold value further comprises:
        summing the zero motion vector sum of absolute difference values from a top level of the hierarchical motion estimation to provide a noise estimate threshold value;
        dividing the noise estimate threshold value by a second predetermined value; and
    adding an offset value.

17. A computer-readable non-transitory medium, carrying instructions, which, when executed, causes computer logic to carry out a method of detecting repeated pictures in a sequence of video picture data, each picture of said video picture data comprising a plurality of macroblocks, the method comprising:
    performing hierarchical motion estimation on the video picture data to provide best motion vectors for each macroblock, best motion vector sum of absolute difference values for each macro block and zero motion vector sum of absolute difference values for each macroblock, wherein the hierarchical motion estimation includes a plurality of levels, and said best motion vectors, best motion vector sum of absolute difference values and zero motion vector sum of absolute difference values for each macroblock are provided for at least a top level;
    providing a noise threshold value based upon the zero motion vector sum of absolute difference values from the top level of the hierarchical motion estimation;
    accumulating the best motion vector sum of absolute difference values for macroblocks having best motion vector sum of absolute difference values greater than the noise threshold value to provide a distortion value for the picture; wherein the accumulating step further comprises ignoring accumulated best motion vector sum of absolute difference values below a fourth predetermined value and setting a repeat flag dependent upon the distortion value;
wherein the picture comprises a TOP field and BOTTOM field, and the step of accumulating comprises carrying out the following pseudo code:

```
Field_Distortion=0;
For all macroblocks in a Field
I f(Best_MV_SAD>Field_Noise_Threshold)
   Field_Distortion+=Best_MV_SAD;
if(Field_Distortion>fourth predetermined value)
   Field_Distortion=Field_Distortion−fourth predetermined value else
   Field_Distortion=0;
if(Field_Distortion<fifth predetermined value)
   Field_Distortion=fifth predetermined value/(1+Field_Distortion); else
   Field_Distortion=1;
```
for the TOP fields or BOTTOM fields separately.

\* \* \* \* \*